May 1, 1923.
W. J. BEISEL
SPRING WHEEL
Filed Dec. 7, 1921  3 Sheets-Sheet 2
1,453,542
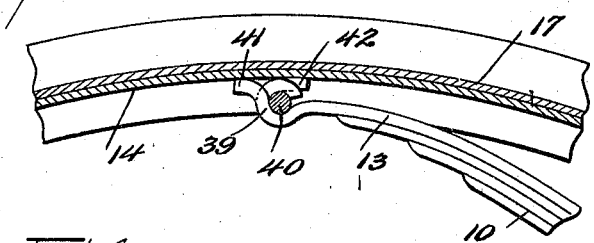
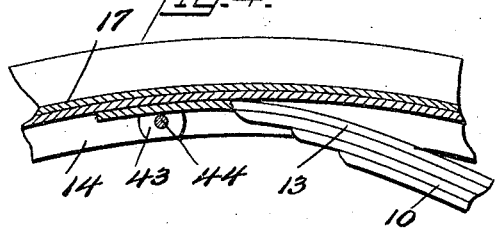
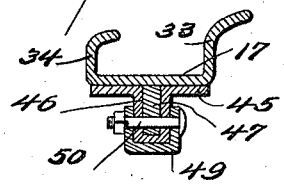
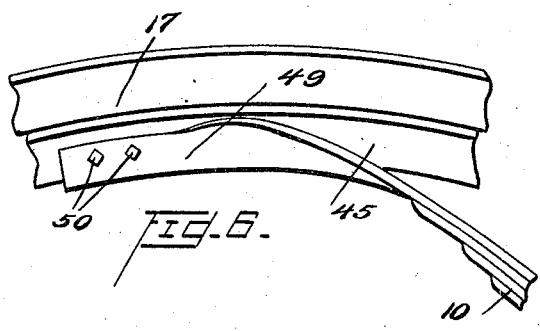
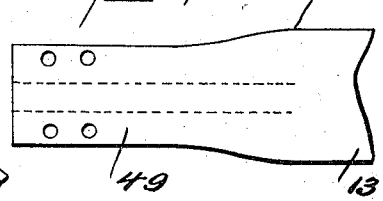
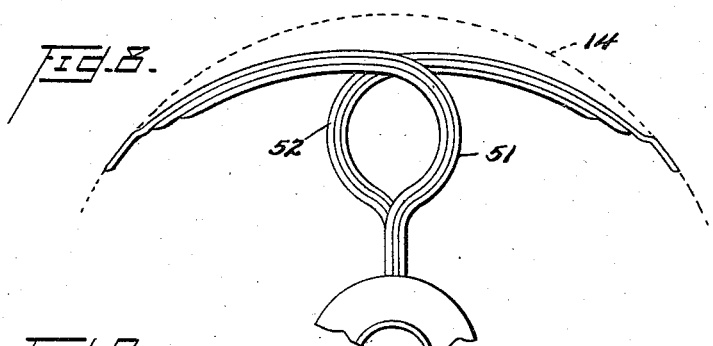
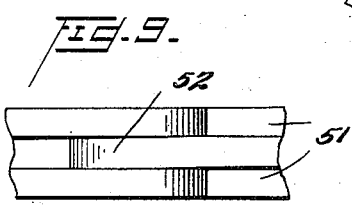
Inventor
William J. Beisel
By Watson, Coit, Morse & Grindle
Attorney May 1, 1923.
W. J. BEISEL
SPRING WHEEL
Filed Dec. 7, 1921
1,453,542
3 Sheets-Sheet 3
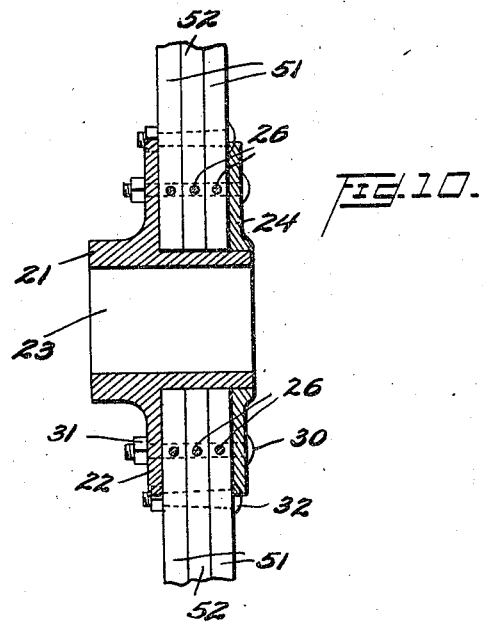
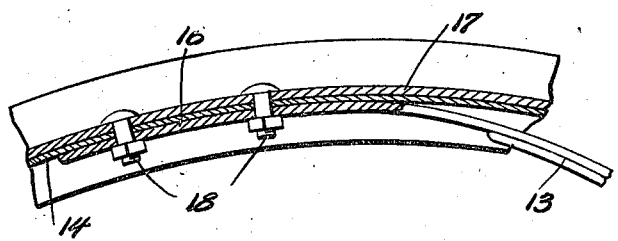
Inventor
Wm. J. Beisel
By Watson, Coit, Morse & Grindle
Attorneys Patented May 1, 1923.

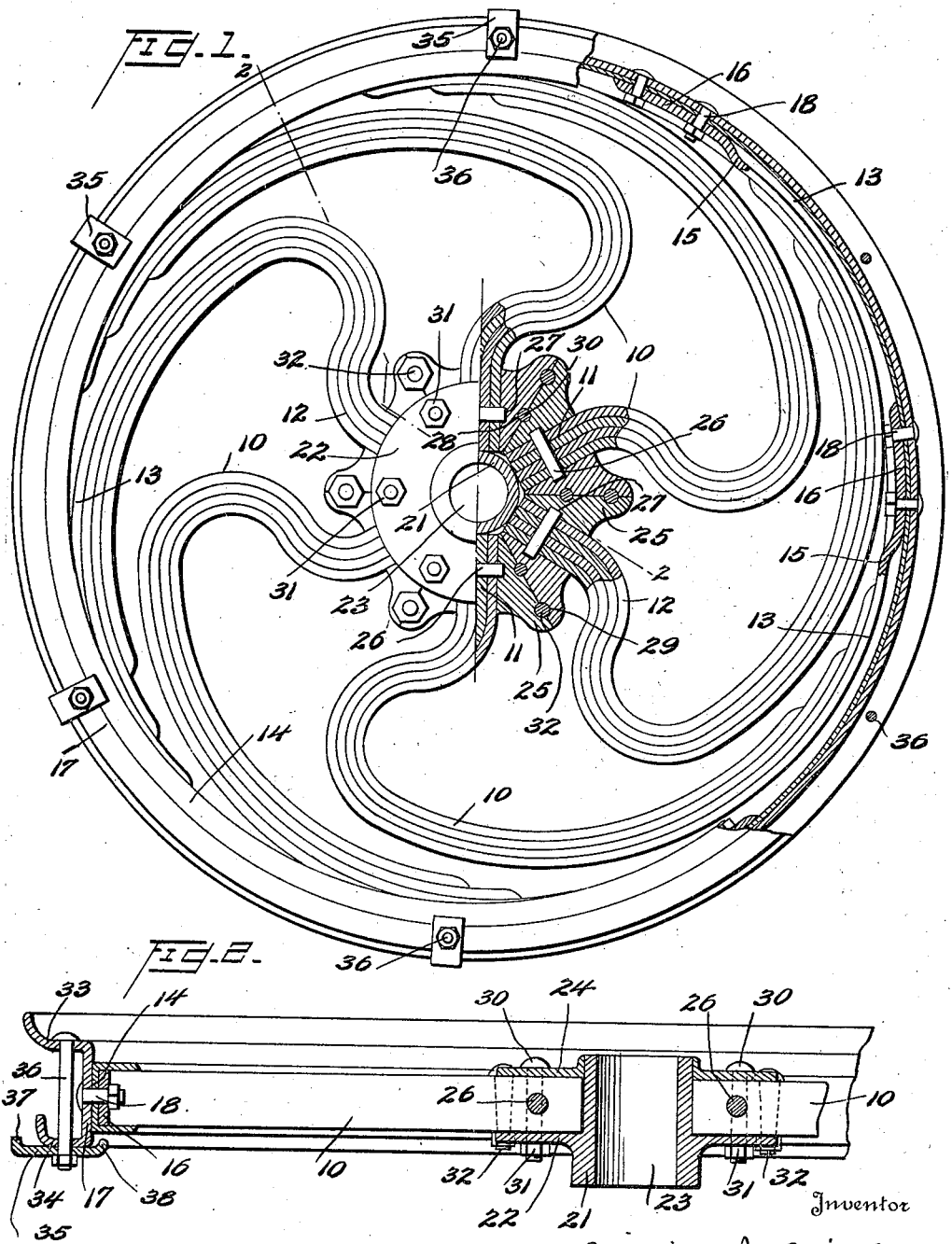

1,453,542

UNITED STATES PATENT OFFICE.

WILLIAM JAKOB BEISEL, OF PORT RICHMOND, NEW YORK.

SPRING WHEEL.

Application filed December 7, 1921. Serial No. 520,577.

*To all whom it may concern:*

Be it known that I, WILLIAM J. BEISEL, a citizen of the United States, and resident of Port Richmond, Richmond County, State of New York, have invented certain new and useful Improvements in Spring Wheels, of which the following is a specification.

This invention relates to spring wheels for vehicles and its objects and the results produced by it include such strength and lasting qualities as fully satisfy the requirements in use, such simplicity of structure as makes manufacture easy and comparatively inexpensive, and such resiliency as avoids transmission to the axle of objectionable shocks and jars when passing over obstructions.

It is furthermore adapted to receive and hold on its outer surface a demountable tire rim. The novel features will be more fully understood from the following description and claims taken with the accompanying drawings. In the drawings:

Fig. 1 is a side view of a wheel embodying the invention, one half being shown in vertical section;

Fig. 2 is a section on the line 2—2 of Figure 1;

Fig. 3 is a detail section through a part of the rim showing modified means for securing the ends of the spokes to the rim;

Fig. 4 is a similar view of another modified form;

Fig. 5 is a cross section of another form;

Fig. 6 is a side view of what is shown in Fig. 5;

Fig. 7 is a plan view of the end of the spoke;

Fig. 8 is a side view of a modification showing spokes bent in opposite directions, and Figure 9 is a plan view of the ends of the spokes shown in Figure 8;

Figure 10 is a section through the hub showing the ends of the spokes in Figure 8 in place; and Figure 11 is a detail section through the rim showing a modified form of spoke at its end.

As shown in the drawing, the wheel embodies a series of similar spring spokes 10, each composed of a series of metal layers or leaves in the form of a leaf spring, and each having a straight inner end portion 11 which enters the hub in a radial plane. Near the hub at the point 12, each spoke is bent or curved laterally or to one side of the radial plane, and is then symmetrically curved or bent outwardly and back across the plane, the radius of curvature increasing before and after that plane is reached until the outer surface of the outer leaf 13 is a distance from the hub nearly equal to the contemplated inner diameter of the rim and it is then slightly bent or offset at 15 outwardly and continues on the arc of a circle having the center of the hub as its center, as indicated at 16, Figure 1. These offset end portions of adjacent spokes are spaced apart peripherally a slight distance and each inner leaf of each spoke is shorter than its adjacent outer leaf and preferably has an end portion of gradually decreasing thickness. A channel rim 14 facing inwardly fits over the outer ends of the spokes and its side walls or flanges lie close along the sides of the outer and adjacent leaves of the spokes with the offset extensions 16 fitting close against the inner face of its base wall.

An outwardly facing channel bar rim 17 closely fits around the outer surface of rim 14 and is somewhat wider. The outer flange 33 of this rim is higher than the inner flange 34 and the upper edge portions of both flanges are curved laterally and outwardly. This permits a demountable rim carrying a tire to pass over the lower flange 34 and abut throughout its circumference the inclined edge of the higher flange 33. Fastening clips 35 are rotatively mounted on the outer ends of bolts 36 which pass through the side flanges 34 and 33. These clips are so formed that when turned on the bolts to one position, they will lie wholly within the margin of flange 34 permitting the demountable rim to pass to position but when turned to another position, will project out beyond said edge as shown in Figure 2 and engage the outer side of a demountable rim. These clips preferably have an inwardly projecting portion 37 at their upper ends to engage the demountable rim and inwardly projecting portions 38 at their lower ends to engage under rim 17 and prevent accidental turning in use. It is of course necessary to loosen the bolts in order to turn the clips. It will be understood that these clips cooperating with the inclined surface of flange 33 have a wedging action to securely and tightly hold the demountable rim in place. The end portions 16 of the spokes and the base walls of the channel bar rims 14 and 17 are rigidly secured together by bolts 18 passing through them and provided with screw threaded nuts.

Although the means shown in Figures 1 and 2 constitute the preferred form of connection between the ends of the spokes and the channel rim, other means may be used in combination with the two channel rims the outer of which serves to receive a detachable rim. In Figure 3 for instance, is shown a form of connection where a part of the end of the outer portion 13 of the spoke is curled transversely in cylindrical form 39 surrounding a bolt 40 passing through the side flanges of the inner channel rim 14, thus securing the spoke to the rim. In this case projecting portions 41 and 42 make contact with the inner surface of the base of channel rim 14 so as to prevent rattling. In Figure 4 another form is shown where the end of portion 13 of the spoke is provided with perforated side ears 43 which are bent at right angles and a bolt 44 passes through them and through the side flanges of inner channel rim 14 the projecting end of the spoke bearing against the inner face of the channel. The form of spoke end and the means for attaching it to the rim shown in Figure 10 are identical with what is shown in Figure 1 except that the outward curve or offset 15 is omitted.

The hub of the wheel includes the central cylindrical member 21 made of suitable metal, having an integral peripheral flange 22 and a central bore 23 for the axle. A second flange or disk 24 is also carried by member 21 but it is movable longitudinally of the cylindrical portion from one end towards the fixed flange having a central bearing opening slidably engaging said member. The inner end of each spoke abuts the central cylindrical member 21 and has a wedge block 25 on each side closely fitting it from its inner end to a point slightly beyond the margin of flanges 22 and 24. These wedge blocks are identical, and the pair fitting the straight end 11 of a spoke are held in place by a pin 26 passing through the spoke with its projecting ends entering sockets 27 in the blocks. When a spoke and its pair of wedge blocks are in place, the outer faces of the blocks are on radial planes through the center line of the hub midway between that spoke and the two adjacent spokes. These outer surfaces extend towards the rim a greater distance than do the surfaces in contact with the spoke and materially beyond the margin of flanges 22 and 24, the outer ends of the blocks being formed on symmetrical meeting lines circumferentially. Each block has a pair of parallel grooves or depressions 28, 29, formed in its outer face parallel to the axis of the wheel, the inner groove 28 extending from flange 22 to flange 24 within their margins, and the outer groove 29 also extending all the way across the block outside of said margin. Since the blocks are duplicates, the grooves 28 and 29 in two adjacent blocks matching and fitting will form two openings or passageways through the blocks partly in each. Bolts 30 pass through openings formed by grooves 28 and through corresponding openings in flanges 22 and 24, and when the nuts 31 on them are tightened they will clamp the spokes, blocks, flange 24 and the cylindrical hub together in proper operative relation. The bolts by their engaging contact with the walls of the grooves 28 will furthermore so lock adjacent blocks and through them adjacent spokes as to prevent radial outward movement. Bolts 32 in the outer opening formed by grooves 29 beyond the outer margin of the flanges 22—24 also have this locking action. It will be noted that the structure described produces a hub which is very strong and durable, and in which the spokes are so engaged and held that they cannot be displaced under severe strains. The spokes also are strong from the hub outward, the most yielding part of each being near the rim, but that more yielding part taken with the longer leverage on the stronger parts makes the spokes as a whole yield sufficiently to avoid objectionable shocks and jars, and at the same time successfully stand strains tending to cause a break.

This structure permits the use of as low a number of spring spokes as six with perfectly satisfactory results as to strength, resiliency, lasting qualities and general efficiency. It will of course be understood that any number of spokes desired may be used, and that the invention is not limited to the particular form or structural details shown, beyond what is called for in the claims.

In Figures 5, 6 and 7 I have shown a modified form of inner channel bar rim and a modified form of spoke end to fit it and have also shown an added element in the form of a continuous ring interposed between the two channel bar rims. In this instance the inner rim 45 has a narrow channel 46 facing outwardly and laterally extending portions in the form of a cylinder with the center of the hub as its axis lying flat against the inner surface of the outer channel rim 17. The outer channel rim 17 and its means for receiving and retaining a detachable rim are the same as heretofore described and shown in Figures 1 and 2. A solid continuous ring 47 fills the channel in rim 45. In this instance the side portions of the spoke are cut away at the end from the point 48 in Figure 7 and the projecting narrow portion 49 is bent transversely on longitudinal lines to right angles and fits over the inward projection formed by the narrow channel 46 of rim 45. This lateral bending of the narrow portion of the spoke extends somewhat beyond the point 48 but the wider portions of the spoke are gradually bent outward lessening the central longitudinal depression and bringing all parts of the spoke into transverse alignment or into the same transverse plane near the rim. Bolts 50 pass through the lapping sides of portion 49 the walls of channel 46 and ring 47 thereby rigidly securing the ends of the spokes to the inner rim and ring 47. It will be noted that in this form as well as that of Figures 1 and 2 the outer ends of the spokes closely fit the inner portions of the inner channel bar rim and are rigidly bolted to it.

In Figures 8 and 9 is shown a different arrangement of the spring spokes in which instead of having each spoke wide enough to extend across the rim they are made about one third as wide and three spokes radially enter the hub side by side the two outer spokes 51 being curved in one direction from the radial plane and the inner or middle spoke 52 being curved in the opposite direction. The outer ends of these spokes fit the inner surface of the inner channel bar rim and are bolted to it as in the form shown in Figures 1 and 2 but of course no one of them extends transversely entirely across said surface. The number of sets of these spokes like the number of full width spokes shown in Figure 1 in a particular wheel may vary as conditions or judgment dictates.

It will be understood that the inner end of each of the three spokes 51 and 52 side by side has extending through it a pin 26 corresponding to that of figure 1 and that the projecting ends of said pin enter corresponding sockets in the wedge blocks 25 as illustrated in Figure 11. Where wedge blocks are used which extend from one hub flange to the other each is provided with three sockets in longitudinal line to receive the pins but if desired three sets of wedge blocks may be used placed end to end between the hub flanges, each having a length equal to the width of a spoke and each set supporting a separate set of spokes longitudinally of the hub.

Having thus described the invention what I claim as new and desire to secure by Letters Patent is:

1. In a vehicle wheel the combination with a hub of an inwardly facing channel bar rim, a series of similar leaf spring spokes entering said hub radially and secured thereto, each spoke being curved laterally of the radial plane of its inner end at a point near the hub, then reversely with substantial uniformity back to a point near said plane and then on a gradually increasing radius, the ends of the outer leaves entering between the side flanges of the rim, the end portion of the outer leaf beyond the end of the next inner leaf being offset outwardly a short distance lying in close contact with the inner surface of the base of the rim and bolts passing through and connecting said end portions and two rims.

2. In a vehicle wheel, the combination with a hub of an inwardly facing channel bar rim, a series of similar leaf spring spokes entering said hub radially and secured thereto, each spoke being curved laterally of the radial plane of its inner end at a point near the hub then reversely with substantial uniformity back to a point near said plane and then on a gradually increasing radius, the ends of the outer leaves entering between the side flanges of the rim, the end portion of the outer leaf beyond the end of the next inner leaf lying in close contact with the inner surface of the base of the rim and bolts passing through and connecting said end portions and two rims.

In testimony whereof I hereunto affix my signature.

WILLIAM JAKOB BEISEL.